March 7, 1967 J. M. ROBERTS, SR., ET AL 3,307,732
REMOVABLE PLUG FOR A PASSAGE
Filed June 14, 1965
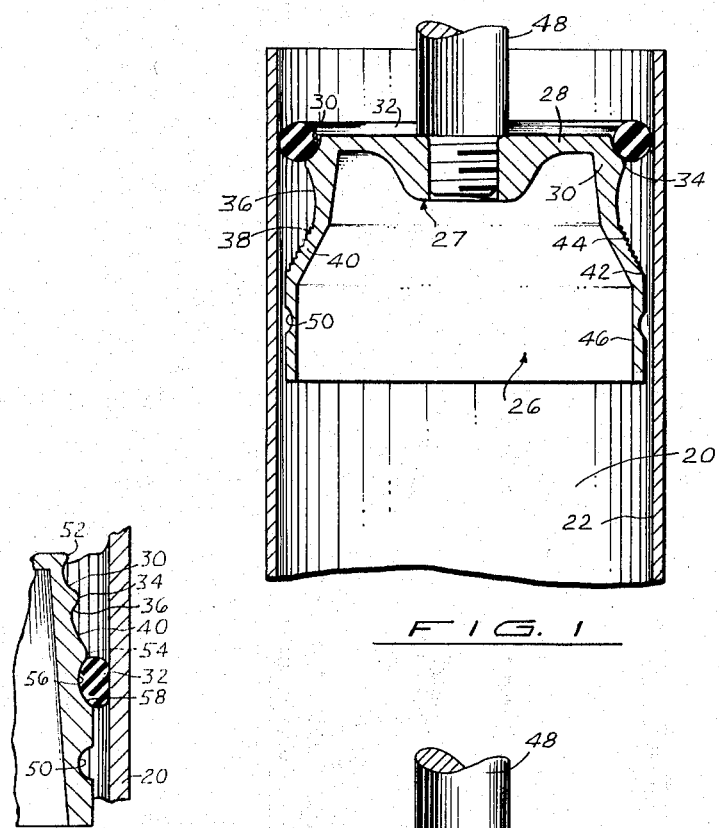
FIG. 1
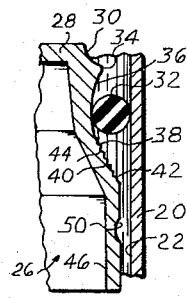
FIG. 3
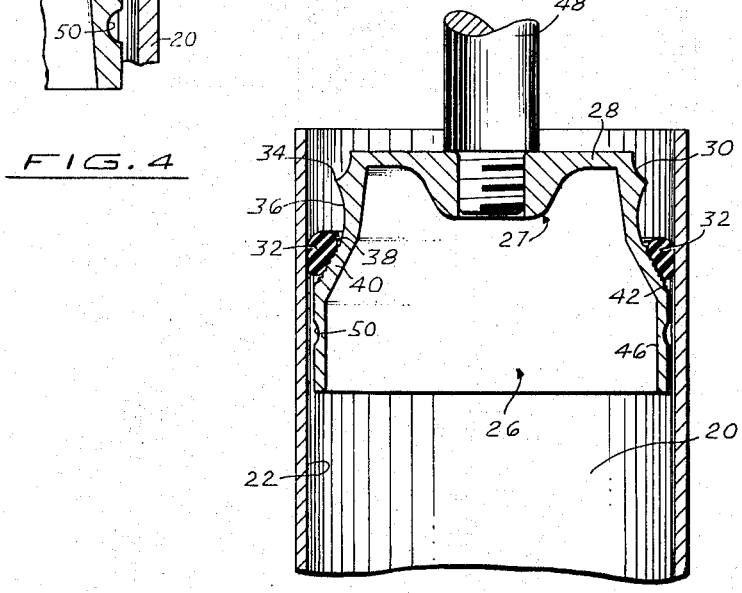
FIG. 4
FIG. 2
INVENTORS
JOSEPH M. ROBERTS SR.
CARLTON M. MELLAN
BY
FULWIDER, PATTON, RIEBER, LEE & UTECHT
ATTORNEYS

United States Patent Office 3,307,732
Patented Mar. 7, 1967

3,307,732
REMOVABLE PLUG FOR A PASSAGE
Joseph M. Roberts, Sr., and Carlton M. Mellan, San Diego, Calif., assignors, by mesne assignments, to de Best Mfg. Co., Inc., Gardena, Calif., a corporation of California
Filed June 14, 1965, Ser. No. 463,825
10 Claims. (Cl. 220—24.5)

The present invention relates to a removable plug for plugging a passage such as the passage in a pipe and more particularly to a removable test plug employing a pliable and stretchable endless gasket or ring, such as an O-ring as the sealing element.

The plug of the present invention includes a plug body having a section forming a tapered surface which is adapted to be surrounded by the sealing ring and which when moved either manually or by fluid pressure, due to the tapered surface, the sealing ring will be pressed into sealing relationship between the tapered surface and the interior surface of the passage, and further includes a seat section for the ring disposed longitudinally of the tapered surface, the seat extending inwardly, and, further includes a recessed third section interposed between the narrow portion of the tapered surface and ridge of the seat.

The diameters of the sealing ring and the seat are such that when the ring rests on the seat it is in non-biased or substantially non-biased condition. Further, in the preferred embodiment, the diameter of the outer edge of the seat is greater than and is spaced longitudinally of the narrowest portion of the tapered surface.

Guiding means, in the form of a skirt, is connected with and extends longitudinally away from the increased portion of the tapered surface, which guiding means, when engaging the inside wall of the passage being plugged, maintains the plug in operative position.

Other features and the advantages of the present invention will be apparent from the following description, reference being had to the accompanying drawing wherein preferred embodiments of the invention are illustrated.

In the drawing:

FIG. 1 is a cross section view of a pipe and the improved plug, showing the plug in non-sealing relationship with the interior surface of the passage of the pipe;

FIG. 2 is a view similar to FIG. 1 but showing the plug in passage sealing position;

FIG. 3 is a fragmentary sectional view of the plug showing the ring in the recessed section; and FIG. 4 is a fragmentary sectional view of another embodiment of the invention.

Referring more in detail to the drawing, the passage 20 is shown as formed by the inside wall 22 of a pipe 24. The plug 26 is in the form of a cup, herein shown as inverted. The plug includes a main body 27 having a top section 28, forming a seat 30 for a pliable, flexible, resilient and stretchable sealing gasket or ring 32, preferably formed of rubber or synthetic rubber. The seat is arcuately shaped in cross section and extends inwardly from a circumferential ridge 34.

The side section 36 of the plug body 27, immediately below the ridge 34, extends inwardly and downwardly and joins with the upper edge of the narrowest portion 38 of a downwardly flared circumferential surface 40. Thus, the section between the ridge 34 and bottom or enlarged portion 42 of the flared surface 40 is in the form of a recess which may be termed a holding recess. Preferably, the flared surface 40 is circumferentially grooved or serrated as shown at 44. Thus the ridge 34 is located longitudinally upwardly of the narrowest portion of the tapered section 40.

The plug body 27 is also formed with a guiding section 46 in the form of a skirt which extends away from the enlarged portion of the taper, i.e., it extends longitudinally, downwardly from the bottom 42 of the tapered section 40. It is adapted to prevent undue cocking of the plug in the passage since it is adapted to engage the inside wall 22 of the pipe. Thus the seat 30 is adjacent what may be termed the trailing end of the plug body 27 and the guiding section or skirt 46 is adjacent what may be termed the leading end of the plug body.

A handle 48 is suitably attached to the plug 26 for manipulating the same.

The inside diameter of the sealing ring 32 is less than the diameter of the ridge 34 when the ring is in an unbiased or substantially unbiased position so that the ring rests freely or substantially freely on the seat 30. The inside diameter of pipes vary although they are referred to in the trade, as for example "a three inch pipe." Such pipes may vary as much as three-sixteenths of an inch. Therefore in some pipes, a ring will contact the inner wall of the pipe, and, in some pipes, the ring will not engage the inner wall thereof, but the inner portion thereof must be circumferentially less than the circumference of the ridge. The relationship is such that after the plug body 27 and the ring 32 are placed in position in pipe 24, by pulling upwardly on the plug body 27, through handle 48, the ridge 34 will be moved upwardly relative to the ring, whereby the ring is disposed in the recessed section 36 and is slightly squeezed between the wall of the recess and the pipe to frictionally hold the plug in sealing position in the pipe. Recess may be referred to as a "holding recess" or "holding groove." Increasing of pressure in pipe 24 and in the cup shaped plug effects further upward movement of the plug body 27 to further squeeze the ring between the tapered section 40 and the pipe wall 22.

The inside diameter of the ring 32 being less than the diameter of the ridge 34, there is no tendency on the part of the ring to creep upwardly past the ridge after the plug has been moved to place the ring in the recess 36, which latter would be the case in the event the recess is not provided. Therefore, when the plug is placed in the pipe and moved to place the ring in the recess 36, the attendant need not hold the plug in position or manually prevent the ring from working upward, and consequently, the attendant is free to move to the valve used for applying fluid pressure to the underside of the plug. As soon as fluid pressure is applied, the plug will move instantly from the position shown in FIG. 3 to a more compressed position shown in FIG. 2. Thus, one person can make the necessary test for pressure whereas heretofore two persons were necessary, one for preventing the sealing ring from working upwardly while the other activated the valve which controlled the flow of fluid to the pipe.

After the pressure is released in the pipe, the entire plug 26 can be removed readily. It is necessary only to push downwardly on the plug body 27. This movement will release the squeezed ring 32 since the tapered section is moved toward its narrowest section relative to the ring. As the ring approaches the ridge due to the frictional resistance between the periphery of the ring and the inside wall of the pipe, the ring remains stationary or substantially so while the plug body 27 is being moved downwardly, whereby on continued downward movement of the plug body, the ridge will be moved below the ring, i.e., to the position shown in FIG. 1. The entire plug can then be removed from the pipe as a unit.

A groove 50 is provided in the skirt 46 for retaining the ring 32 when the plug is not being used. The circumference of this groove is such that the ring is under tension and is thereby resiliently held in position but can be readily rolled out of the groove.

By virtue of the present invention, there has been provided a simplified, inexpensive, highly desirable, test plug which is exceedingly simple to construct, to install, to operate both for rendering the same operative and inoperative. It can be formed of any desirable material and is preferably cup shaped to reduce the weight thereof. Moreover, by providing the groove 50, the ring can be stored or shipped as an assembly with the plug body 27.

The inside diameters of various compositions of pipes vary; some are larger than others, yet are referred to in inches as the same. Due to the construction of the ridge 34, the recess provided by wall section 36 and the taper 40, the plug of the present invention is effective regardless of these slight variations in diameters. Therefore, it may be necessary under certain conditions to hold the ring in position manually, as by the fingers, when starting movement of the plug body upwardly from the position shown in FIG. 1 to that shown in FIG. 3, but when it is once in to the position shown in FIG. 3, it remains there untitl manually removed.

Referring now to the embodiment shown in FIG. 4, wherein the upper edge of the seat is provided with a radially extending ridge 52 whereby the seat 30 may function as a holding groove for the ring 32, the holding groove 36 and the tapered portion 40 being retained, the tapered portion terminating in a ridge 54. Another recessed or grooved section 56 is disposed below the ridge 54; it is provided with a tapered section 58 which increases in diameter downwardly.

This embodiment, as illustrated in FIG. 4, is particularly useful for plugging smaller diameter pipes in which, although referred to in the trade as an "X" diameter, there is relatively greater variance in the inside diameter. The recessed section 36 functions as a holding groove for the ring 32 when the plug is used in connection with a relatively thick walled, relatively small inside diameter pipe and the recess 36 functions at the holding groove for the ring when the plug is used in connection with a thin walled, relatively large inside diameter pipe. In the former case, i.e., when the seat also functions as a holding groove, the tapered section 40 below recess 36 functions to further compress ring 32 upon upward movement of the plug. In the latter case, i.e., when the recess 56 functions as the holding groove, the tapered section 58 therebelow functions to further compress ring 32 upon upward movement of the plug.

While the forms of embodiment herein shown and described constitute preferred forms, it is to be understood that other forms may be adopted falling within the scope of the claims that follow.

We claim:
1. A removable plug assembly for closing the open end of a pipe for the purpose of testing the pipe by introducing pressurized fluid into the pipe, comprising:
a plug of generally circular cross section having a leading end and a trailing end;
a resiliently deformable and stretchable ring of a given unrestrained inside diameter to embrace the plug to form a seal between the plug and the inner circumferential surface of the pipe; and
means on the trailing end of the plug to serve as a handle for manipulating the plug,
said plug being formed near its trailing end with an outer circumferential seat for said ring,
said plug having a circumferential holding recess between said seat and the leading end of the plug,
said plug having a circumferential ridge separating the seat from the holding recess, said ridge being of greater outside diameter than the least diameters of both the recess and the seat, said ridge being of greater outside diameter than the said given unrestrained inside diameter of the ring,
the region of maximum diameter of the plug being towards the leading end of the plug from the holding recess,
the surface of the holding recess being flared towards said region of maximum diameter,
whereby with the sealing ring embracing said seat, the plug may be inserted into the open end of the pipe and then retracted to cause the ring to be rolled between the plug and the pipe from said seat across said ridge into the holding recess and the fluid under pressure may be introduced into the pipe to cause further retraction of the plug with consequent wedging of the sealing ring between the inside surface of the pipe and the flared surface of the holding recess.

2. A plug assembly as set forth in claim 1 in which said flared surface is serrated.

3. A plug assembly as set forth in claim 1 in which said region of maximum diameter of the plug is of substantially uniform diameter and of an axial dimension to cooperate with the surrounding pipe to guide the plug and to stabilize the plug when the sealing ring is wedged between the plug and the surrounding pipe.

4. A plug assembly as set forth in claim 1 in which said seat tapers towards the trailing end of the plug.

5. A plug assembly as set forth in claim 1 in which the inside diameter of said ring and the diameter of said seat are such that the ring rests on the seat in a substantially non-stretched condition.

6. A removable plug assembly for closing the open end of a pipe for the purpose of testing the pipe by introducing pressurized fluid into the pipe, comprising:
a plug of generally circular cross section having a leading end and a trailing end;
a resiliently deformable and stretchable ring of a given unrestrained inside diameter to embrace the plug to form a seal between the plug and the inner circumferential surface of the pipe; and
means on the trailing end of the plug to serve as a handle for manipulating the plug,
said plug having a circumferential ridge spaced from the trailing end of the plug and defining with the trailing end of the plug a seat for initially holding said ring,
said plug having a circumferential holding recess on the side of said ridge towards the leading end of the plug,
said plug having a leading guiding portion of maximum diameter,
said holding recess having a surface flared towards said guiding portion,
whereby with the sealing ring embracing said seat, the plug may be inserted into the open end of the pipe and then retracted to cause the ring to be rolled between the plug and the pipe from said seat across said ridge into the holding recess and the fluid under pressure may be introduced into the pipe to cause further retraction of the plug with consequent wedging of the sealing ring between the inside surface of the pipe and the flared surface of the holding recess.

7. A plug assembly as set forth in claim 6 in which said plug is formed with an additional holding recess spaced from said first mentioned recess towards the guiding portion of the plug, said additional holding recess being of a larger diameter than the first mentioned holding recess.

8. A plug assembly as set forth in claim 6 in which the outer edge of the seat at the trailing end of the plug is of greater diameter than the least diameter of said holding recess.

9. A plug assembly as set forth in claim 8 in which the diameter of the outer edge of the seat at the trailing end of the plug is greater than the least diameter of said holding recess.

10. A removable plug assembly for closing the open end of a pipe for the purpose of testing the pipe by introducing pressurized fluid into the pipe, comprising:
a plug of generally circular cross section having a leading end and a trailing end; and a resiliently deformable and stretchable ring of a given unrestrained inside diameter to embrace the plug to form a seal between the plug and the inner circumferential surface of the pipe;

said plug having a guiding portion of maximum diameter near its leading end, said plug being formed with a plurality of circumferential holding recesses between its trailing end and said guiding portion, each of said recesses having a surface flared towards the leading end of the plug, said holding recesses being of progressively increased diameter towards said guiding portion, the plug being formed with a circumferential ridge between the successive holding recesses, the outside diameter of the circumferential ridge being greater than said given unrestrained inside diameter of the ring, whereby with the sealing ring embracing the plug near the trailing end of the plug, the plug may be inserted into the open end of the pipe and then retracted to cause rolling action between the plug and the pipe to advance the ring to one of said recesses that is of an inside diameter relative to the inside diameter of the pipe for sealing action on the ring, then fluid under pressure may be introduced into the pipe to cause further retraction of the plug with consequent wedging of the sealing ring between the inside surface of the pipe and the flared surface of said one holding recess.

References Cited by the Examiner

UNITED STATES PATENTS

| | | | |
|---|---|---|---|
| 437,289 | 9/1890 | Clark | 220—24.5 |
| 521,835 | 6/1894 | Tillinghast | 220—24.5 |

THERON E. CONDON, *Primary Examiner.*

J. B. MARBERT, *Assistant Examiner.*